United States Patent
Swan (10) Patent No.: US 6,863,261 B2
(45) Date of Patent: Mar. 8, 2005

(54) VALVE STOP

(75) Inventor: Julian F. R. Swan, Ealing (GB)

(73) Assignee: Baxter International Inc., Dearfield, IL (US)

(*) Notice: Subject to any disclaimer, the term of this patent is extended or adjusted under 35 U.S.C. 154(b) by 8 days.

(21) Appl. No.: 10/095,894

(22) Filed: Mar. 12, 2002

(65) Prior Publication Data

US 2003/0173537 A1 Sep. 18, 2003

(51) Int. Cl.⁷ ............................................. F16K 51/00
(52) U.S. Cl. ............................................. 251/356
(58) Field of Search ....................... 251/85, 333, 334, 251/335.3, 356; 137/510, 494, 495, 15.19, 15.17, 315.33

(56) References Cited

U.S. PATENT DOCUMENTS

| | | | |
|---|---|---|---|
| 274,447 A | 3/1883 | Kennish | |
| 1,893,401 A | 1/1933 | De Jesus-Angeles | |
| 2,555,490 A | 6/1951 | Horn | |
| 2,893,381 A | 7/1959 | Black | |
| 3,356,267 A | 12/1967 | Scholle | |
| 3,511,407 A | * 5/1970 | Palma | 220/203.13 |
| 3,608,574 A | 9/1971 | Beaussant | |
| 3,746,036 A | 7/1973 | Du Bois et al. | |
| 3,752,366 A | 8/1973 | Lawrence, Jr. | |
| 3,754,690 A | 8/1973 | Marchant | |
| 3,768,970 A | 10/1973 | Malmin | |
| 3,980,097 A | * 9/1976 | Ellis | 137/283 |
| 4,071,025 A | 1/1978 | Kohnke | |
| 4,073,307 A | * 2/1978 | Royce | 251/333 X |
| 4,102,476 A | 7/1978 | Loeffler | |
| 4,135,513 A | 1/1979 | Arisland | |
| 4,167,184 A | 9/1979 | Köhnke | |

(List continued on next page.)

FOREIGN PATENT DOCUMENTS

| | | |
|---|---|---|
| AU | B-77302/87 | 2/1988 |
| AU | B-83126/87 | 7/1988 |
| AU | B-46621/89 | 6/1990 |
| AU | B-57350/90 | 1/1991 |
| AU | B-35525/93 | 5/1993 |
| AU | B-32520/93 | 7/1993 |
| AU | B-23138/92 | 9/1993 |
| AU | A-59472/94 | 6/1994 |
| AU | B-60636/96 | 9/1996 |
| AU | B-56228/96 | 1/1997 |
| AU | 730578 | 11/1997 |
| CH | 538964 | 10/1971 |
| CH | 582 098 A5 | 11/1976 |
| CH | 582 098 | 11/1976 |
| DE | 87 01 155.7 U1 | 4/1987 |
| DE | 87 01 155.7 | 5/1987 |
| DE | 200 16 799 U 1 | 2/2002 |
| DE | 200 16 799 U1 | 3/2002 |
| EP | 01 016626 A | 1/1989 |
| EP | 0 762 028 A1 | 12/1997 |
| EP | 0 835 149 B1 | 5/2000 |

(List continued on next page.)

*Primary Examiner*—Eric Keasel (57) ABSTRACT

A stop (20) for a dispensing valve (10) is adapted to be moveable between a first position abutting a valve surface (28) to seal an opening (30), and a second position spaced from the surface (28) to open the opening (30). The stop (20) has a base (52), and a sealing member (54) connected to the base (52) by a hinge member (60). The sealing member (54) has a sealing surface (66) at a distal end. The sealing member (54) extends away from the base (52) in a first molded position (MP). The sealing member (66) is foldable at the hinge member (60) to a second position (FP) wherein the sealing surface (66) faces generally towards the base (52). The method of making the valve stop (20) includes injection molding the stop (20) such that the sealing surface (66) is free of split-lines.

7 Claims, 4 Drawing Sheets

U.S. PATENT DOCUMENTS

| | | | |
|---|---|---|---|
| 4,179,051 A | | 12/1979 | Thomas |
| 4,287,996 A | * | 9/1981 | Wanderer .................... 217/108 |
| 4,356,823 A | | 11/1982 | Jackson |
| 4,401,224 A | * | 8/1983 | Alonso ....................... 215/11.5 |
| 4,420,097 A | | 12/1983 | Motsenbocker |
| 4,483,465 A | | 11/1984 | Lawrence |
| 4,534,542 A | | 8/1985 | Russo |
| 4,537,387 A | | 8/1985 | Danby et al. |
| 4,621,544 A | | 11/1986 | Re |
| 4,635,897 A | | 1/1987 | Gallant |
| 4,662,598 A | | 5/1987 | Weingarten |
| 4,693,400 A | | 9/1987 | Frahm et al. |
| 4,709,900 A | | 12/1987 | Dyhr |
| 4,747,522 A | | 5/1988 | McIntyre |
| 4,941,598 A | | 7/1990 | Lambelet, Jr. et al. |
| 5,050,758 A | | 9/1991 | Freeman et al. |
| 5,076,322 A | | 12/1991 | Choksi et al. |
| 5,133,324 A | | 7/1992 | Michiaki |
| 5,197,638 A | | 3/1993 | Wood |
| 5,238,217 A | | 8/1993 | Fell |
| 5,241,985 A | | 9/1993 | Faust et al. |
| 5,245,991 A | | 9/1993 | Kawaguchi |
| 5,285,547 A | | 2/1994 | Sebor |
| 5,299,718 A | | 4/1994 | Shwery |
| 5,355,673 A | | 10/1994 | Sterling et al. |
| 5,409,035 A | | 4/1995 | Scott et al. |
| 5,472,123 A | | 12/1995 | Jangaard |
| 5,499,947 A | * | 3/1996 | Tauber .................... 251/356 X |
| 5,607,073 A | | 3/1997 | Forrer |
| 5,622,274 A | | 4/1997 | Bright |
| 5,634,491 A | | 6/1997 | Benedict |
| 5,643,195 A | | 7/1997 | Drevet et al. |
| 5,653,251 A | | 8/1997 | Handler |
| 5,732,737 A | | 3/1998 | Condon |
| 5,826,621 A | | 10/1998 | Jemmott |
| 5,850,908 A | | 12/1998 | Jasek |
| 5,989,469 A | | 11/1999 | Dirr |
| 6,032,831 A | | 3/2000 | Gardner et al. |
| 6,050,444 A | | 4/2000 | Sugg |
| 6,070,767 A | | 6/2000 | Gardner et al. |
| 6,117,169 A | * | 9/2000 | Moe .......................... 623/2.12 |
| 6,145,695 A | | 11/2000 | Garrigues |
| 6,145,707 A | | 11/2000 | Baudin |
| 6,148,860 A | | 11/2000 | Sigler |
| 6,200,261 B1 | * | 3/2001 | Deininger et al. ............ 600/29 |
| 6,247,619 B1 | | 6/2001 | Gill et al. |
| 6,264,166 B1 | | 7/2001 | Bowland et al. |
| 6,273,117 B1 | | 8/2001 | McPhee |
| 6,290,090 B1 | | 9/2001 | Essebaggers |
| 6,305,570 B1 | | 10/2001 | Atkin et al. |
| 6,364,168 B1 | | 4/2002 | Gardner et al. |
| 6,550,493 B2 | | 4/2003 | Williamson et al. |
| 6,554,023 B2 | | 4/2003 | Danby et al. |
| 2002/0005417 A1 | * | 1/2002 | De Laforcade ............. 222/481 |

FOREIGN PATENT DOCUMENTS

| | | |
|---|---|---|
| EP | 1 281 897 A1 | 7/2002 |
| FR | 1.024.522 | 4/1953 |
| FR | 1.145.605 | 10/1957 |
| FR | 2 664 812 A1 | 1/1992 |
| FR | 2 664 812 | 1/1992 |
| JP | 55-107690 | 8/1980 |
| JP | 2001/208237 | 3/2001 |
| WO | WO 88/02339 | 4/1988 |
| WO | WO 91/06335 | 5/1991 |
| WO | WO 93/16928 | 9/1993 |
| WO | WO 94/06514 | 3/1994 |
| WO | WO 94/12222 | 6/1994 |
| WO | WO 95/23742 | 9/1995 |
| WO | WO 96/19253 | 6/1996 |
| WO | WO 97/27119 | 7/1997 |
| WO | WO 99/12597 | 3/1999 |
| WO | WO 99/38423 A1 | 8/1999 |
| WO | WO 99/62787 | 12/1999 |
| WO | WO 00/01435 | 1/2000 |
| WO | WO 00/29192 A3 | 5/2000 |
| WO | WO 00/29192 A2 | 5/2000 |
| WO | WO 00/37128 | 6/2000 |
| WO | WO 00/37327 | 6/2000 |
| WO | WO 00/53248 | 9/2000 |
| WO | WO 01/00263 | 1/2001 |
| WO | WO 01/19449 A1 | 3/2001 |
| WO | WO 01/92133 A2 | 12/2001 |
| WO | WO 01/92133 A3 | 12/2001 |
| WO | WO 02/100320 A1 | 12/2002 |

* cited by examiner

VALVE STOP

TECHNICAL FIELD

The present invention relates generally to a stop for a valve used in conjunction with a fluid container or tubing, and more specifically to a stop having a seal surface void of a split line on the seal surface.

BACKGROUND OF THE INVENTION

Fluid containers for holding beverages such as water, soda, juice, sport drinks or alcoholic beverages are well known. Containers may hold a variety of other fluids including medicines, soaps and chemicals. A beverage container often has a simple cap that is removed by the user prior to consuming the beverage. In certain instances, the container may have a dispensing valve connected to the container opening to dispense the fluid from the container. A dispensing valve may also be used in tubing connected to a fluid container. The dispensing valve typically has a stop that seals against a surface defining an opening in the valve. When the stop is spaced from the opening, the valve is in an open position wherein fluid is allowed to flow through the valve. The dispensing valve typically requires a user to manipulate the valve by hand to alternate between the open position and a closed position. In some instances, it is desirable that the valve not require hand manipulation to be activated. Thus, some dispensing valves may be activated by alternative methods. For example, a dispensing valve can be configured to be opened by a user applying a partial vacuum to the valve such as by sucking or inhaling through the valve.

In such configurations where the valve is vacuum actuated, the stop of the valve is typically biased to a closed position. It is desirable for the biasing force to be sufficient so that the valve will not leak. In order to open the valve, the biasing force must be overcome. If the biasing force is larger than the force applied by the suction force, the valve will not open. Therefore, it is desirable to have a biasing force that is large enough to provide a fluid tight seal, while at the same time, is small enough so that it can be easily overcome by a user applying a partial vacuum through the valve.

The stop member of such a dispensing valve is typically an injection molded part. The stop has a seal surface that has split lines on the surface from side action mold halves that abut during the injection molding process. The split lines on the sealing surface of the stop prevent a substantially smooth even sealing surface. Consequently, an increased biasing force or compressive force is typically required to maintain a fluid tight seal. This, however, can detrimentally increase the vacuum required to open the valve. Thus, it is desirable for the stop of the valve to have a smooth seal surface void of any split lines as it will minimize the biasing force needed to create a fluid tight seal. It will also minimize the vacuum required to open the valve.

The present invention is provided to solve these and other problems.

SUMMARY OF THE INVENTION

The present provides a stop for a valve.

The valve has a surface defining an opening. The stop is adapted to be moveable between a first position abutting the surface to seal the opening and a second position spaced from the surface to open the opening.

According to a first aspect of the invention, the stop is formed in an injection-molding process. The stop has a sealing surface that is substantially smooth and even along its entire surface. The sealing surface is void of split lines from the injection molding process.

According to another aspect of the invention, the stop has a base adapted to be connected to the valve. The stop also has a sealing member connected to the base by a hinge member. The sealing member has a frustoconical outer surface and the sealing surface is at a distal end of the sealing member. The sealing member extends away from the base in a first molded position wherein the sealing surface faces generally away from the base. The sealing member is foldable at the hinge member to a second position wherein the sealing surface faces generally towards the base. A portion of the sealing member is adapted to pass through the valve opening wherein the sealing surface is adapted to abut the valve surface.

According to another aspect of the present invention, a method of manufacturing the valve stop includes an injection molding process. Mold sections are provided and are configured wherein the sealing surface of the stop is formed in the line of draw of the molten material injected in the process to form the stop. The sealing surface is then free from split lines. After molten material is injected into the mold and solidified, the part is ejected from the mold. The sealing member of the formed valve stop is then folded to the second position.

Other aspects and features of the invention will be apparent from the following specification taken in conjunction with the following drawings.

DETAILED DESCRIPTION

While this embodiment is susceptible of embodiment in many different forms, there is shown in the drawings and will herein be described in detail preferred embodiments of the invention. It is to be understood that the present disclosure is to be considered as an exemplification of the principles of the invention. This disclosure is not intended to limit the broad aspect of the invention to the illustrated embodiments.

Figure 1:
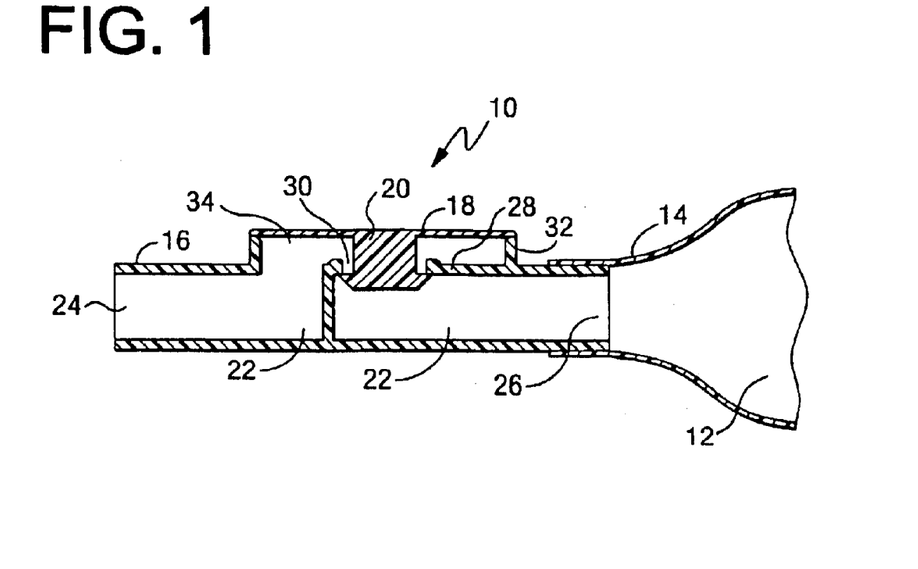
FIG. 1 is a cross sectional view of a valve utilizing a stop of the present invention.
Figure 2:
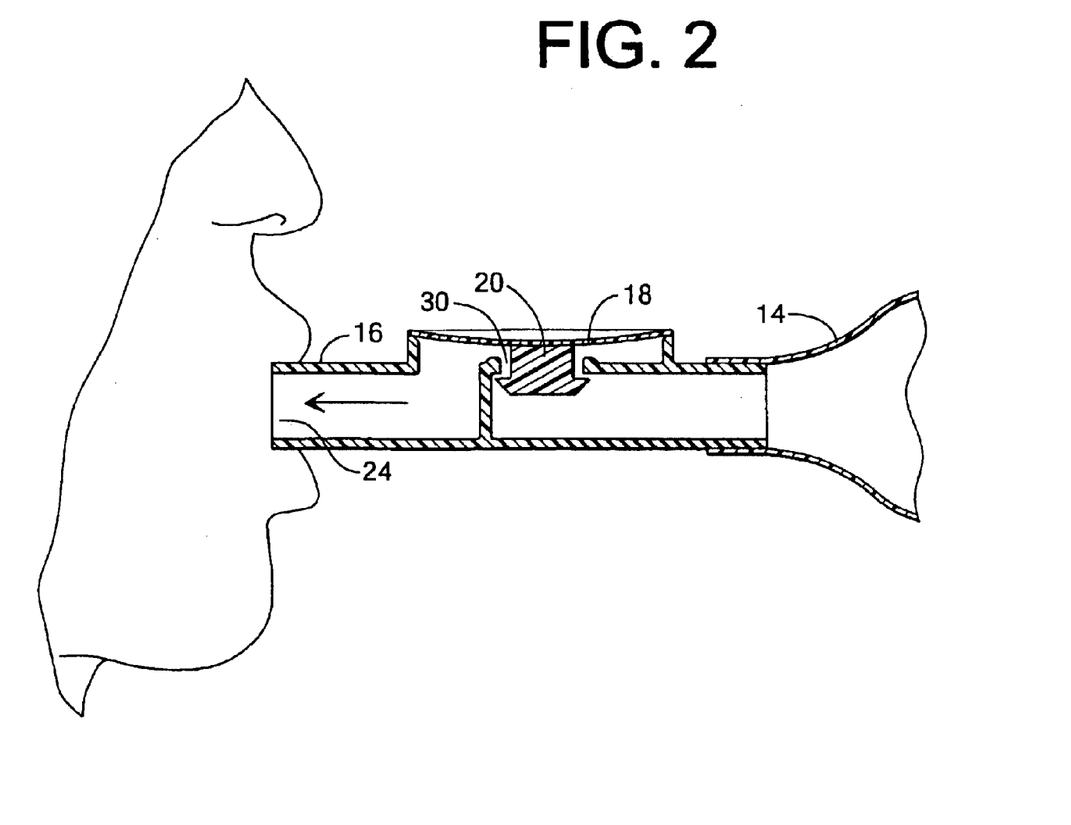
FIG. 2 is a cross sectional view of the valve of FIG. 1, wherein the valve is in the activated, or open position.

FIGS. 1–2 show an embodiment of the valve stop of the present invention incorporated into a valve designated with the reference numeral 10. The valve stop of the present invention can be used in a variety of different valves. FIGS. 1–2 show a dispensing valve 10 used to dispense a fluid 12 such as from a beverage container 14. The valve 10 generally includes a housing 16, a diaphragm member 18 and a valve stop 20. The valve housing 16 defines a passageway 22 between an outer opening 24 and an inner opening 26. The inner opening 26 is in fluid communication with the fluid container 14. The housing 16 has an internal wall 28 defining an internal opening 30. The housing further has an annular rim 32 defining an aperture 34.

The diaphragm member 18 is a flexible member and sized to correspond to the annular rim 32. The valve stop 20, described in greater detail below, is connected to the diaphragm member 18. The valve stop 20 can be integrally formed with the diaphragm member 18.

As further shown in FIG. 1, the diaphragm member 18 is connected to the annular rim 32 closing the aperture 34. The valve stop 20 passes through the internal opening 30 and abuts against an underside surface of the internal wall 28 to close the internal opening 30. FIG. 1 thus shows the valve 10 in a closed position. FIG. 2 shows the valve 10 in an open position. The diaphragm member 18 is flexible to a second position wherein the valve stop 20 is spaced from the internal wall 28 to open the internal opening 30 allowing fluid to pass from the container 14, through the passageway 22 and out of the outer opening 24. As shown in FIG. 2, the diaphragm member 18 can be flexed by a user applying a partial vacuum to the housing 16.

Figure 3:
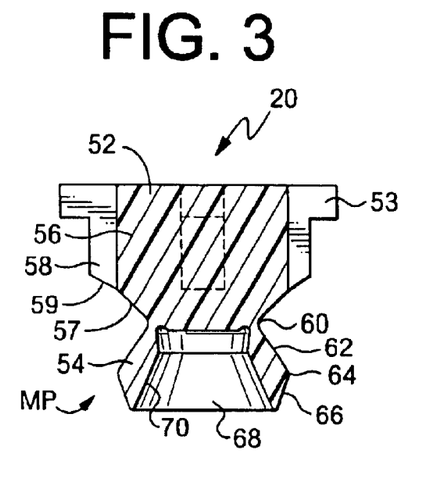
FIG. 3 is a cross sectional view of one embodiment of the stop of the present invention in a first molded position.
Figure 4:
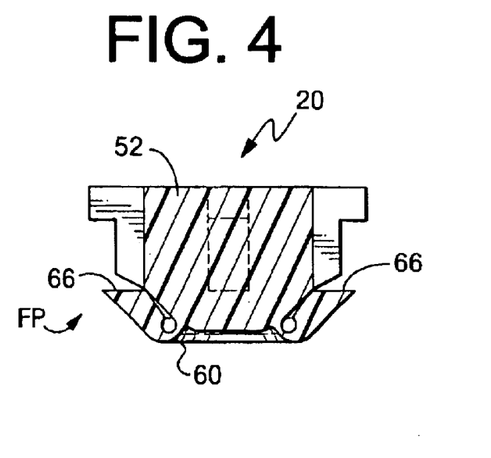
FIG. 4 is a cross sectional view of the stop of FIG. 3 in a second folded position.
Figure 5:
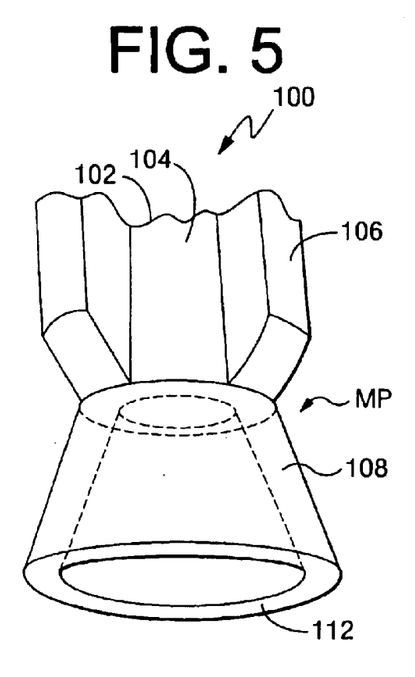
FIG. 5 is perspective view of another embodiment of the stop of the present invention in a first molded position.

FIGS. 3 and 4 show one embodiment of the valve stop 20 of the present invention unattached from the diaphragm member 18 shown in FIGS. 1–2. The structure of the valve stop 20 will first be described and then a method of making the valve stop 20 will be described. As shown in FIGS. 3 and 5, the valve stop 20 generally includes a base member 52 and a sealing member 54. The base member 52 supports the sealing member 54 and serves as a connector between the sealing member 54 and a diaphragm 20, as shown in FIG. 2. The base member 52 has rigidity sufficient to allow it to function as a connector between the diaphragm 18 and the sealing member 54 without deforming when a force sufficient to seal and unseal the valve 10 is applied. In this embodiment, the base member 52 and sealing member 54 are a single molded part. The base 52 includes a central core 56. A plurality of longitudinal ribs 58 extend from the core 56 and run axially along the central core 56. Grooves are defined between the ribs 58. While the number of ribs 58 may vary, in one preferred embodiment, the base 52 has four ribs 58. The ribs 58 have a tapered distal end 59 and terminate at an inclined section 57 on the base 52, proximate to the sealing member 54. The length of the ribs 58 can vary. At an opposite end of the base 52, the ribs 58 extend to a flange 53 extending from the central core 56. The flange 53 can serve as a connection point to the diaphragm 18.

As further shown in FIGS. 3 and 4, the sealing member 54 is generally a frusto-conical or cone-shaped member. The sealing member 54 has a hinge member 60 at a proximal end that connects the sealing member 54 to the base 52. The hinge member 60 has a reduced thickness relative to the rest of the sealing member 54. The hinge member 60 will be described in greater detail below.

As discussed, the sealing member has a generally frusto-conical shape, thus having a frustoconical outer surface 62. At a distal end 64 of the sealing member 54, is a sealing surface 66 that is generally adjacent to the outer surface 62. The sealing member 54 has an internal recess 68 defining a frustoconical inner surface 70. The sealing surface 66 is substantially smooth and even across its entire surface and void of any split lines from an injection molding process used to make the stop 20. This is a function of the unique method of making the stop 20 as will be described below.

FIG. 3 shows the stop 20 in a molded position MP as the result of the injection molding process. The sealing member 54 extends generally away from the base 52 in this first molded position. The sealing surface 66 also extends generally away from the base 52. FIG. 4 shows the stop 20 in a second, folded position FP. The hinge member 60 allows the sealing member 54 to be manipulated from the first molded position MP (FIG. 3), to the second folded position FP (FIG. 4). The hinge member 60 experiences plastic deformation wherein the sealing member 54 maintains the folded position shown in FIG. 4. The outer frustoconical surface 62 abuts the inclined surface 57 of the base 52. The sealing surface 66 faces generally towards the base 52, and is in a position to engage an underside surface of the housing internal wall 28 shown in FIG. 1. In the second folded position FP shown in FIG. 4, a portion of the sealing surface 66 extends radially outwardly of the longitudinal ribs 58. The sealing member 54 is folded shortly after, or during, ejection from a mold tool (not shown) used in the injection molding process. In the folded configuration, valve stop 20 may be referred to as an inverted cone seal. It is understood that the process is controlled such that the sealing member 54 is stable in both the molded position MP and the folded position FP. When the valve 10 is connected to a fluid container, any fluid pressure in the container will not cause failure of the valve stop 20 in the folded position FP. In addition, the pre-load force on the valve stop 20 in its folded position will be larger than the maximum force that could be developed by the biasing force of the diaphragm member 18.

As can be appreciated from FIGS. 1 and 4, the valve stop 20 can be connected to the diaphragm member 18. A portion of the valve stop 20 passes through the internal opening 30 wherein the sealing surface 66 abuts the underside surface of the internal wall 28. As discussed, the sealing surface 66 is smooth, even and free from any split lines associated with the injection molding process. Because of this unique configuration, only a minimal biasing, pre-load force is required to maintain a seal in the valve 10. Consequently, only a minimal partial vacuum is required to open the valve 10. Thus, a user can operate the valve 10 with less effort.

Figure 6:
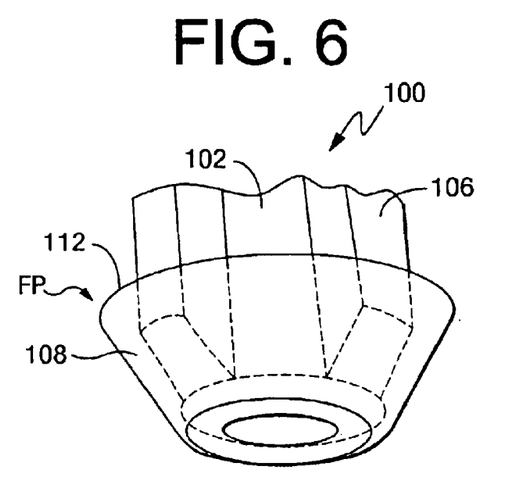
FIG. 6 is a perspective view of the stop of FIG. 5 in a second folded position.

FIGS. 5–6 show another embodiment of the valve stop of the present invention, represented generally by reference numeral 100. The valve stop 100 generally has a base 102 and a sealing member 108. The base member 102 has a central core 104 and longitudinal ribs 106 that run axially along the central core 104. The central core 104 may be solid throughout, or in other embodiments, it may be hollow. Here, the ribs 106 extend to the end of the central core 104 where it joins the sealing member 108. The ribs 106 taper at an angle to the base of the sealing member 108. Other embodiments of the present invention do not utilize ribs. In these embodiments the central core may be the sole component of the base member.

Similar to the sealing member 54 in FIGS. 3–4, the sealing member 108 has a generally frustoconical shape. At a distal end, the sealing member 108 has a sealing surface 112. The sealing surface 112 is substantially smooth and even. It is void of split lines from the injection molding process.

Proximate to the end of the base member 102 is the hinge member 110 portion of the sealing member 108. The hinge member 110 is the location at which the sealing member 108 is folded from the first molded position MP (FIG. 5) to the second folded position FP (FIG. 6). Folding the sealing member 108 over upon itself brings a sealing surface 112 into the second folded position FP, wherein it faces generally towards the base 102.

As discussed above, it is understood that the valve stop 100 can be attached to the diaphragm 18 of the valve 10 to seal the valve 10. Because the sealing surface 112 is free from any split lines, the valve 10 can be operated with less effort. As shown below, it is further understood that the valve stop 20 can be integrally molded with the diaphragm 18.

Figure 7:
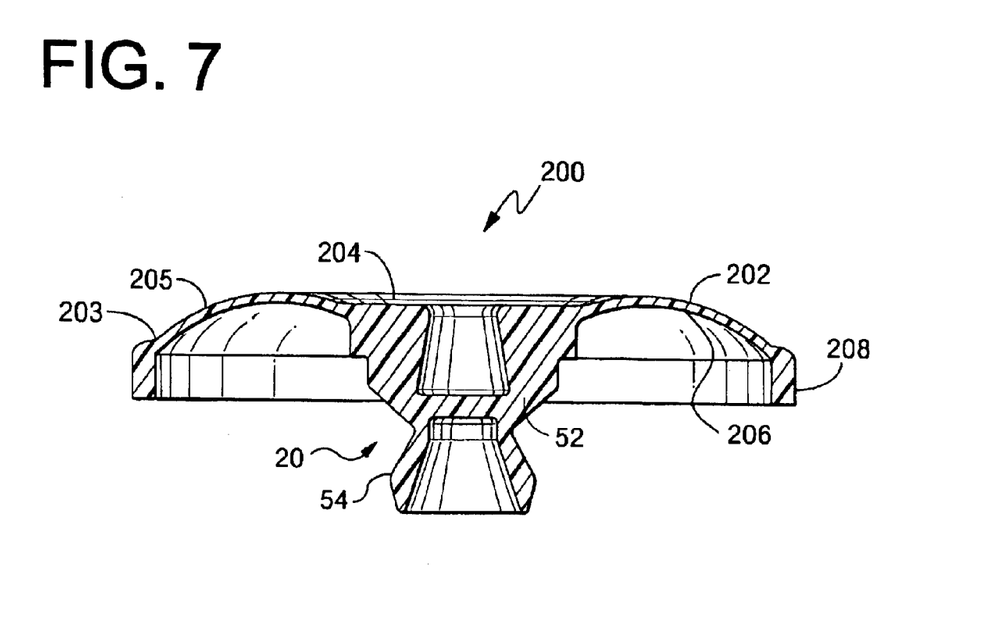
FIG. 7 is a cross sectional view of a valve part having a diaphragm and stop in a first molded position.
Figure 8:
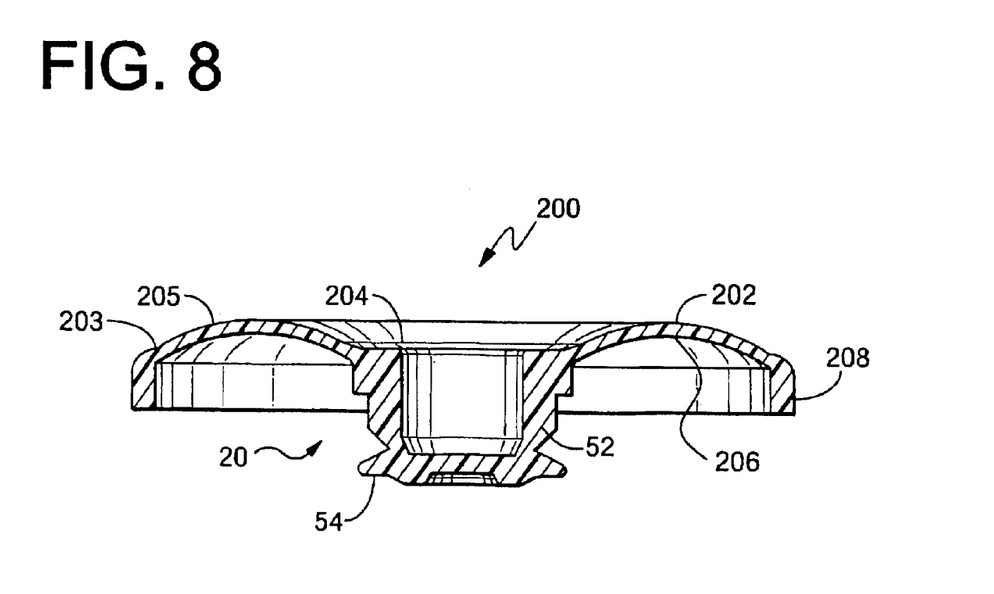
FIG. 8 is a cross sectional view of a valve part having a diaphragm and stop in a second folded position.

FIGS. 7–8 show another embodiment of the valve stop of the present invention incorporated into a valve part designated with the reference numeral 200. The valve part generally forms a portion of a valve used to dispense fluid from a container (See FIG. 1). The valve part 200 includes a diaphragm member 202. The diaphragm member 202 here is an integrally formed portion of the valve part 200 in that the entire valve part 200 is molded from a single piece of material. The diaphragm member 202 is generally in the shape of a ring having an exterior circumference 203 and an interior circumference 204 where the diaphragm member 202 is joined to another portion of the valve part 200. The diaphragm member has a top surface 205 and a bottom surface 206. The diaphragm member 202 is a flexible member with the ability to move in response to forces that are applied to it. Generally, when the valve part 200 is used, a differential between the pressure on the top surface 205, and the bottom surface 206 will be created, and the diaphragm member 202 will move in response to the forces created by the pressure differential. When the pressure is higher on the top surface 205 the diaphragm member will tend to flatten, and when the pressure is higher on the bottom surface 206, the diaphragm member will tend to expand in the direction of the top surface 205. The diaphragm member 202 includes a circumferential seal 208. The circumferential seal 208 is also an integrally formed portion of the valve part 200.

Attached to the diaphragm member 202 is the valve stop 20. The valve stop 20 is also an integrally formed portion of the valve part 200, along with the diaphragm member 202. As discussed with regard to FIGS. 3–4, the valve stop 20 generally includes a base member 52 and a sealing member 54. The base member 52 supports the sealing member 54 and serves as a connector between the sealing member 54 and the diaphragm member 202. The base member 52 includes a central core 56. The central core 56 is generally open at the end at which it is joined to the diaphragm member 202. A plurality of longitudinal ribs 58 extend from the core 56 and run axially along the central core 56. Grooves are defined between the ribs 58. While the number of ribs 58 may vary, in one preferred embodiment, the base 52 has four ribs 58. The ribs 58 have a tapered distal end 59 and terminate at an inclined section 57 on the base 52, proximate to the sealing member 54. The length of the ribs 58 can vary. At an opposite end of the base 52, the ribs 58 extend to a flange 53 extending from the central core 56. The flange 53 can serve as a connection point to the diaphragm member 202.

As further shown in FIGS. 3 and 4, the sealing member 54 in one embodiment is a cone-shaped member. The sealing member 54 has a hinge member 60 at a proximal end that connects the sealing member 54 to the base 52. The hinge member 60 has a reduced thickness relative to the rest of the sealing member 54. The hinge member 60 will be described in greater detail below.

As discussed above in conjunction with this embodiment, the sealing member has a generally frustoconical outer surface 62. At a distal end 64 of the sealing member 54, is a sealing surface 66 that is generally adjacent to the outer surface 62. The sealing member 54 has an internal recess 68 defining a frustoconical inner surface 70. The sealing surface 66 is substantially smooth and even across its entire surface and void of any split lines from an injection molding process used to make the valve part 202. This is a function of the unique method of making the valve part 202 as will be described below.

FIG. 7 shows the valve part 202 wherein the sealing member 54 is in a molded position MP as the result of an injection molding process. The sealing member 54 extends generally away from the base 52 in this first molded position. The sealing surface 66 also extends generally away from the base 52. FIG. 4 shows the valve part 202 in a second, folded position FP. The hinge member 60 allows the sealing member 54 to be manipulated from the first molded position MP (FIG. 7), to the second folded position FP (FIG. 8). The hinge member 60 experiences plastic deformation wherein the sealing member 54 maintains the folded position shown in FIG. 8. The outer frustoconical surface 62 abuts the inclined surface 57 of the base 52. The sealing surface 66 faces generally towards the base 52. In the second folded position FP shown in FIG. 8, a portion of the sealing surface 66 extends radially outwardly of the longitudinal ribs 58. As previously discussed, the sealing surface 66 is smooth, even and free from any split lines associated with the injection molding process.

Figure 9:
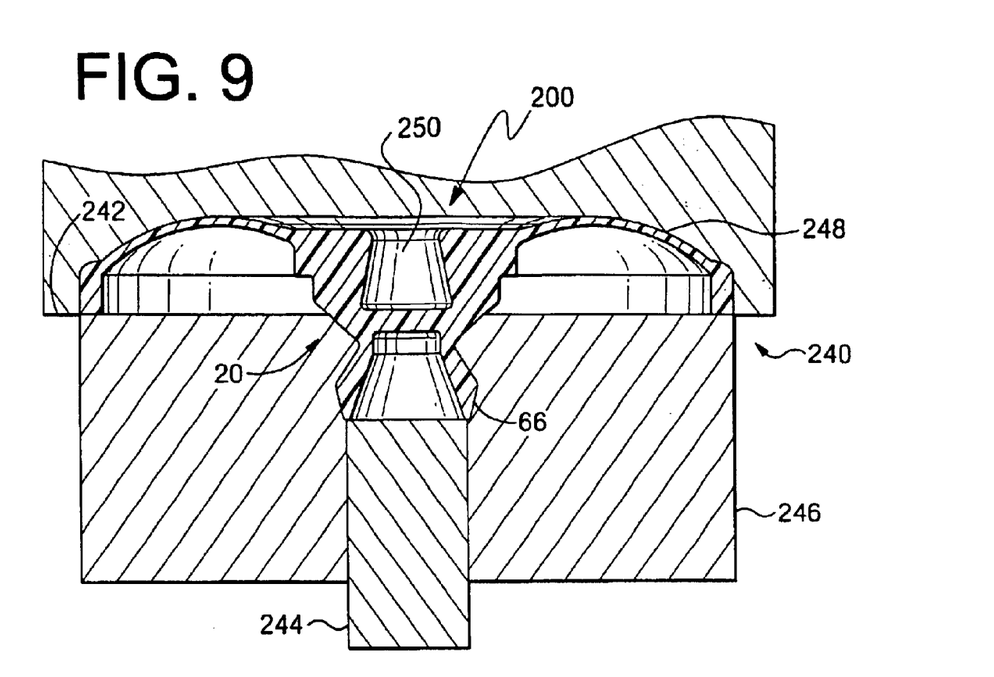
FIG. 9 is a cross sectional view of the valve part in a mold.
Figure 10:
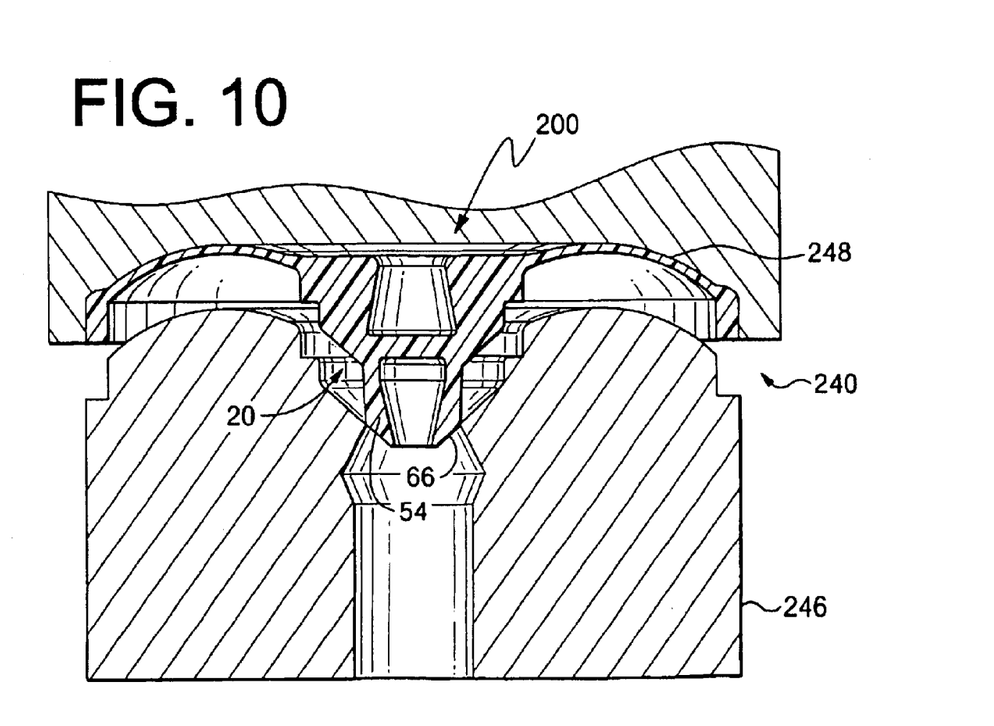
FIG. 10 is a cross sectional view of the valve during a mold release process.

FIGS. 9–10 disclose a method of manufacturing the valve part 200 inclusive of the valve stop 20. The method generally utilizes an injection molding process. The injection molding process uses a multi-section mold represented generally by reference numeral 240. The multiple sections of the mold 240 come together so that the sealing surface 66 of a valve part 200 manufactured using the mold 240 is free of split lines. The mold includes a first fixed member 242, a first core member 244, and a second core member 246. The first fixed member 242 includes a molding surface 248 wherein the circumferential seal 208 and the top surface 204 of the diaphragm 202 are formed during the injection molding process. In addition, the first fixed section 242 includes a reverse tapered portion 250, which extends through the diaphragm 202 when a valve part 200 is formed in the mold 240. The reverse tapered portion 250 ensures the valve part 200 remains fixed in place throughout the injection molding process.

A first core member 244 is a movable pin used for the formation of the frustoconical inner surface 70 of the sealing member 54 as seen when the valve part 200 is in a first molded position MP. A second core member 246 is an independently movable portion of the mold 240. When the mold 240 is in the closed position, as shown in FIG. 9, the second core member 246 is in a position such that the sealing surface 66, the outer frustoconical surface 62, and the other portions of the stop member 20 are formed between it and the two other mold members 242, 244 when molten material is injected into the mold 240. This mold setup produces a valve part 200 having a sealing surface 66 free of split lines, as the second core member 246, as a single mold piece, forms the entire sealing surface 66. There are not multiple mold pieces used to form the sealing surface 66 that would provide split lines. It is further understood that the sealing surface 66 is formed in the line of draw in the process.

After injection and at least partial curing of the material, the first core member 244 is withdrawn away from the first fixed member 242. After the first core member 244 has been removed, the second core member 246 is withdrawn from the first fixed member 242, to which the valve part 200 remains attached due to the reverse tapered portion 250 of the first fixed member 242. The sealing member 54 of the valve part 200 is deformable as can be seen in FIG. 10. Therefore, it flexes and allows the second core member 246 to be withdrawn. The formed valve part 200 is then removed from the first fixed member 242, the mold 240 is closed, and the process is repeated. Using this configuration, separate mold members are not brought together to form the portion of the mold 240 that will form the sealing surface 66. This would lead to split-lines on the sealing surface 66, which is undesirable as described above. As a single mold section is used to form the sealing surface 66, the sealing surface 66 is formed free of split lines.

While one mold setup which provides for a sealing surface 66 free of split lines has been disclosed with specificity, it will be appreciated that numerous other mold configurations immediately come to mind which provide the same beneficial results.

Preferably, the mold sections are arranged in a manner wherein the sealing surface 66 is formed in the line of draw of the injected molten material. Additionally, side action molding is preferably not required.

Thus, in another molding configuration, a first mold section may form the inner surface of the frustoconically shaped sealing member 54, and the sealing surface 66. Two other mold sections may form the base member 52 and the outer wall of the generally frustoconically shaped sealing member 54. The split lines, formed where the various mold sections meet, are located axially along the base member 52, axially along the outer wall of the sealing member 54, and along the outer rim of the sealing surface 66 of the sealing member 54 when the valve stop 20 is in the first molded position MP, as shown in FIG. 3. The sealing surface 66 is free of split lines.

Once the mold sections are set and define the mold, molten plastic material is injected into the mold in a line of draw. The material is cooled so the part at least partially solidifies in the mold. The part is then ejected from the mold. The molding process is controlled so that upon ejection from the mold, the part remains slightly uncured for a brief time. While the part is still slightly uncured it remains highly flexible. As shown in FIGS. 3 and 5, the first mold position MP of the valve stop 20,100 has the sealing surface 66,112 facing generally away from the base member 52,102. The slightly uncured sealing member 54,108 is folded along the hinge member 60,110 to the second folded position FP shown in FIGS. 4 and 6. The sealing member 54,108 faces generally towards the base 52,102. After folding, the part is allowed to fully cool and set. The molding process could also be configured wherein a fully cured valve stop 20,100 is folded from the first molded position MP to the second folded position FP.

As shown, the mold sections allow a mold to be formed wherein the sealing surface 66,112 can be formed void of any split lines from abutting mold sections. If for example, the valve stop 20 was simply molded as a solid part having the configuration shown in FIG. 4, the sealing surface would be considered an undercut surface requiring at least a pair of side action mold sections to form the part. The side action mold sections would form split lines on the sealing surface. Molding the valve stop 20,100 as shown, the sealing surface 66,112 is free of split lines leading to a valve 100 that can be sealed with less pre-load force.

It will be understood that the invention may be embodied in other specific forms without departing from the spirit or central characteristics thereof. The present embodiments, therefore, are to be considered in all respects as illustrative and not restrictive, and the invention is not to be limited to the details given herein.

What is claimed is:

1. A stop for a dispensing valve, the dispensing valve having a surface defining an opening, the stop adapted to be moveable between a first position abutting the surface to seal the opening and a second position spaced from the surface to open the opening, the stop comprising:

a base adapted to be connected to the valve;
a sealing member being connected to the base by a hinge member, the sealing member having a frustoconical outer surface, the sealing member having a sealing surface at a distal end, the sealing member extending away from the base in a first position wherein the sealing surface faces generally away from the base, the sealing member being foldable at the hinge member to a second position wherein the sealing surface faces generally towards the base, a portion of the sealing member adapted to pass through the opening wherein the sealing surface is adapted to abut the valve surface; and,
wherein the base has a peripheral surface, the base having a plurality of longitudinal ribs extending therefrom.

2. A stop for a dispensing valve, the dispensing valve having a surface defining an opening, the stop adapted to be moveable between a first position abutting the surface to seal the opening and a second position spaced from the surface to open the opening, the stop being formed in an injection-molding process, the stop comprising:

a base adapted to be connected to the valve, the base having a peripheral surface, the base having a plurality of longitudinal ribs extending therefrom;
a sealing member being connected to the base by a hinge member, the sealing member having a frustoconical outer surface, the sealing member having a sealing surface at a distal end generally adjacent the frustoconical outer surface, the sealing surface being substantially smooth across the entire surface and void of any split-line from the injection-molding process, the sealing member extending away from the base in a first molded position wherein the sealing surface faces generally away from the base, the sealing member being foldable at the hinge member to a second position wherein the sealing surface faces generally towards the base, a portion of the sealing member adapted to pass through the opening wherein the sealing surface is adapted to abut the valve surface.

3. A stop for a dispensing valve, the dispensing valve having a surface defining an opening, the stop adapted to be moveable between a first position abutting the surface to seal the opening and a second position spaced from the surface to open the opening, the stop comprising:

a base adapted to be connected to the valve, wherein the base has a peripheral surface, the base having a plurality of longitudinal ribs extending therefrom;
a sealing member being connected to the base by a hinge member, the sealing member having a frustoconical outer surface, the sealing member having a sealing surface at a distal end, the sealing member extending away from the base in a first position wherein the sealing surface faces generally away from the base, the sealing member being foldable at the hinge member to a second position wherein the sealing surface faces generally towards the base, a portion of the sealing member adapted to pass through the opening wherein the sealing surface is adapted to abut the valve surface, wherein the sealing surface is substantially smooth and even across its entire surface.

4. The stop of claim 3 wherein a portion of the sealing surface extends radially outwardly of the longitudinal ribs.

5. The stop of claim 3 wherein the base has three longitudinal ribs extending therefrom.

6. The stop of claim 3 wherein the sealing surface is generally adjacent the frustoconical outer surface.

7. The stop of claim 3 wherein the sealing surface is void of a split line from an injection molding process.

* * * * *